(No Model.)

L. W. SHARPE.
RUNNING GEAR FOR VEHICLES.

No. 440,778. Patented Nov. 18, 1890.

Witnesses
Albert B. Blackwood
Jos H Blackwood

Inventor
Lemuel W. Sharpe
by Franklin H. Hough
his Attorney

UNITED STATES PATENT OFFICE.

LEMUEL W. SHARPE, OF OSAGE, MINNESOTA, ASSIGNOR TO S. S. McKINLEY, OF SAME PLACE.

RUNNING-GEAR FOR VEHICLES.

SPECIFICATION forming part of Letters Patent No. 440,778, dated November 18, 1890.

Application filed February 27, 1890. Serial No. 341,997. (No model.)

*To all whom it may concern:*

Be it known that I, LEMUEL W. SHARPE, a citizen of the United States, residing at Osage, in the county of Bicher and State of Minnesota, have invented certain new and useful Improvements in Running-Gear for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in running-gear for vehicles; and it has for its object to provide a wagon in which the hind wheels will at all times follow the track of the front wheels in turning angles, so that in driving where there are obstructions—such as stumps, stones, or the like or in the crowded streets of cities— all that is necessary for the driver to do is to watch the front wheels of his vehicle, as any object which he can pass with the front wheels the hind wheels will escape.

The invention consists in the peculiar combinations and in the novel construction, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, like letters of reference indicating like parts throughout the several views, and in which drawings—

Figure 1:
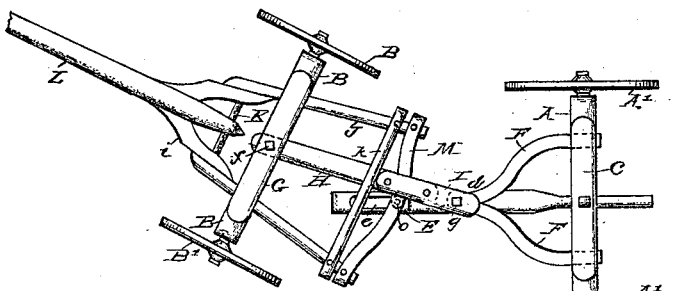
Figure 2:
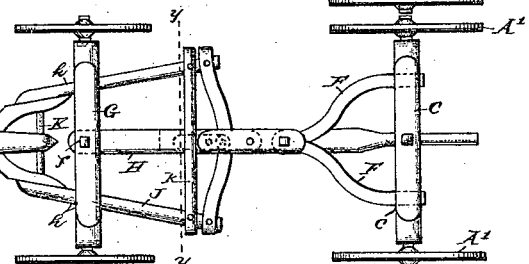
Figure 3:
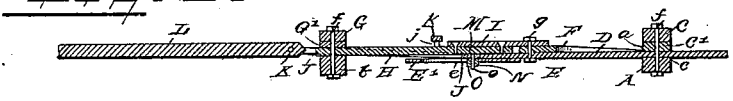
Figure 4:
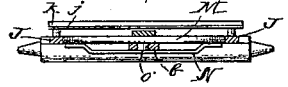

Figure 1 is a top plan showing the parts in position as in turning. Fig. 2 is a like view with the parts in a straight line. Fig. 3 is a longitudinal vertical section through the same. Fig. 4 is a transverse section upon the line $y$ $y$ of Fig. 2.

Reference now being had to the details of the drawings by letter, A designates the rear axle, and A' the rear wheels; B, the forward axle, and B' the forward wheels.

C is the rear bolster, between which and the rear axle is the wearing-plate C'.

D is a reach secured to the rear axle and seated in a recess $a$ therein beneath the wearing-plate. Secured to the forward end of the reach D is a metallic plate E, a portion E' of which extends beyond the end of the reach, and is formed with the elongated slot $e$. That portion of the plate E which is secured to the reach is provided with the inwardly-extending side flanges $b$, which embrace the sides of the reach, as shown.

F F are the rear hounds, the rear ends of which are seated and secured in recesses $c$ on the upper side of the rear axle and the under face of the wearing-plate C', the hounds being connected near their forward ends with the reach D by means of the loop or staple $d$.

G is the forward bolster, and G' the wearing-plate thereunder, the upper side of the wearing-plate and the upper face of the front axle being slightly hollowed out inversely to provide a space to receive the forward end of the front portion H of the reach. The forward end of this front portion of the reach is pivotally connected to the forward axle by means of the king-bolt $f$, which passes through the front bolster, wearing-plate, front end of the reach H, and into the forward end of the axle, as shown.

The rear end of the reach H has secured thereto upon the top and bottom thereof a metallic plate I, which extends beyond the rear end thereof and loosely embraces the forward ends of the hounds F, and pivotally connected thereto by means of the vertical pin or pivot $g$.

J J are the front hounds, the forward portions of which are seated in grooves or recesses $h$ in the upper side of the front axle and the under face of the front wearing-plate and secured therein in any well-known way. The front ends of the forward hounds extend beyond the front axle and are connected by means of the transverse removable rod K, on which is loosely sleeved the rear end of the tongue L, the said rear end being braced by means of the inclined braces $i$. The rear ends of the forward hounds are connected by the curved bar M, which is provided upon its under side with the guide-bar N, secured thereto at its ends, and in the space between this guide-bar and the curved bar M is arranged the roller O, which works on a vertical spindle o, held in said curved bar and guide-bar, said roller working in the elongated slot e of the portion E' of the plate E and engaging the walls of said slot, and in the movement of the parts the curved bar M moves over and is supported by the said portion E' of the plate E. From the rear end of the forward hounds rise the uprights j, connected by the transverse bar k, which serves as a guide for the forward reach on its upper side, the curved bar M forming a guide for said reach upon its under side, said transverse bar k and the curved bar M serving to prevent vertical displacement of the forward reach.

The operation will be readily understood. In turning corners or making sharp turns to avoid obstructions or for other cause, if the front wheels are turned to avoid said obstructions, the driver need not fear for his hind wheels, for they are sure to follow the front wheels, and will therefore clear the obstruction if the front wheels do so. The hind wheels stand still, as it were, as the front wheels are turning a sharp angle and turn about in the same spot in which they are when the front wheels begin to turn.

By the above construction the vehicle is less liable to turn over in turning on a hillside, as the wheels stand bracing in turning, as shown in Fig. 1. The tongue is prevented from striking the horses in passing over rough roads.

What I claim to be new is—

1. The combination, with the front and rear axles and wheels, of the rear reach, the plate secured to the forward end thereof and slotted, the front reach pivotally connected with the front axle and with the front hounds, and the front hounds carrying a roller working in the slot of the plate in the rear reach, substantially as shown and described.

2. The combination, with the front and rear axles, wheels, and reaches and hounds, of the pin pivotally connecting the rear end of the forward reach with the forward end of the rear hounds, the slotted plate in the rear hounds, and the roller and guide-bars in the front hounds, substantially as shown and described.

In testimony whereof I affix my signature in the presence of two witnesses.

LEMUEL W. SHARPE.

Witnesses:
O. S. McKINLEY,
S. S. McKINLEY.